United States Patent Office 3,040,066
Patented June 19, 1962

---

3,040,066
1-DEHYDRO-17α-BROMO-6α-FLUORO-PROGESTERONE

David J. Marshall, Westmount, Quebec, Canada, assignor to American Home Products Corporation, New York, N.Y., a corporation of Delaware
No Drawing. Filed Dec. 2, 1959, Ser. No. 856,662
1 Claim. (Cl. 260—397.3)

This invention relates to 1-dehydro-17-haloprogesterones and to methods by which they may be prepared. More particularly it relates to 1-dehydro-17α-haloprogesterones and to 1-dehydro-6α,17α-dihaloprogesterones and methods for preparing them. Especially, it relates to the compounds 1-dehydro-17α-bromoprogesterone and 1-dehydro-17α-bromo-6α-fluoroprogesterone and to methods for their preparation.

The novel compounds of this invention may be represented by the formula

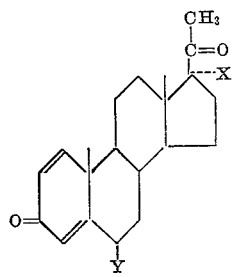

in which X represents fluorine, chlorine, or bromine, and in which Y represents hydrogen or fluorine. These compounds are active as progestational agents, both by the oral route and by injection. The progestational action of these compounds is of unusually long duration, which property is obviously very desirable in progestational agents. A further advantage is that they are not androgenic.

The novel 1-dehydro-haloprogesterones of this invention may be prepared from the corresponding haloprogesterones by dissolving in a lower tertiary alcohol and reacting with selenium dioxide. The products are then purified by chromatography and crystallization. The over-all reaction may be represented by the following equation, in which X and Y have the above-indicated significance:

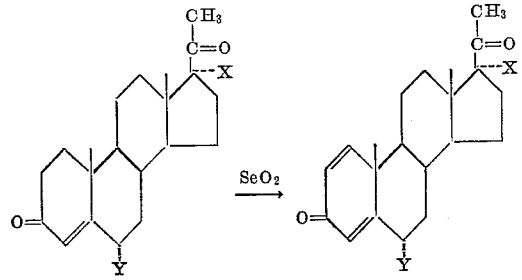

The following examples give details of the preparation of the new compounds, but these are intended to be illustrative only and not to limit my invention, the scope of which is defined in the appended claims.

EXAMPLE 1

1-Dehydro-17α-Bromoprogesterone

A mixture of 2.00 g. of 17α-bromoprogesterone (prepared as described by Engel and Jahnke, Can. J. Biochem. and Physiol., 35, 1047 (1957)), 100 ml. of t-butanol, 1 ml. of acetic acid, and 0.60 g. of selenium dioxide is heated under reflux under nitrogen for four hours. An additional 0.60 g. of selenium dioxide is added and refluxing is continued for an additional 4½ hours. The mixture is cooled to room temperature, filtered through diatomaceous earth (Filter-Cel) and the filter cake is washed with ethyl acetate. The residue left after evaporation of solvents from the combined filtrate and washings is redissolved in ethyl acetate and washed successively with dilute sodium bicarbonate solution, cold freshly-prepared ammonium sulfide solution, cold dilute ammonia water, water, 5% hydrochloric acid, and finally water again. The thus washed solution is dried over anhydrous magnesium sulfate, and the solvent is then evaporated off leaving a residue of 1.8 g. of an amorphous product. A 1.5 g. portion of this product is dissolved in a small volume of methylene chloride and poured into a chromatography column containing 45 g. of Florisil (a synthetic magnesium silicate). 1300 ml. of petroleum ether containing 5% acetone is then passed through the column to elute the desired product. The resulting solution is evaporated and the residue is crystallized from acetone and hexane, yielding 1-dehydro-17α-bromoprogesterone, which melts with decomposition at 149–151° C. Recrystallization raises the melting point to 153–154° C. (with decomposition).

$$\lambda_{Max.}^{EtOH} = 244\ m\mu$$

Analysis.—Calculated for $C_{21}H_{27}O_2Br$: C, 64.46; H, 6.96; Br, 20.43. Found: C, 64.55; H, 7.00; Br., 20.56.

EXAMPLE 2

1-Dehydro-17α-Bromo-6α-Fluoroprogesterone

A mixture of 5.0 g. of 17α-bromo-6α-fluoroprogesterone (preparation of which is described in my co-pending application of Serial No. 767,091, filed October 14, 1958), 250 ml. of t-butanol, 2.5 ml. of acetic acid, and 1.5 g. of selenium dioxide is heated to refluxing temperatures under a blanket of nitrogen for 4½ hours. An additional 1.5 g. of selenium dioxide is then added and refluxing is continued for an additional 4.5 hours. The mixture is cooled to room temperature and filtered through a bed of diatomaceous earth (Filter-Cel), and the filter cake is then washed with ethyl acetate. The combined filtrate and washings are freed of solvents and redissolved in ethyl acetate. This solution is washed successively as described in Example 1, and the crude product, dissolved in benzene, is chromatographed on 150 g. of Florisil. The crystalline material (1.80 g.) eluted with 3.5 liters of 1:1 ether-benzene mixture is recrystallized from methylene chloride-methanol mixture, yielding 1-dehydro-17α-bromo-6α-fluoroprogesterone, melting (with decomposition) between 178 and 180° C. Further recrystallization raises the melting point to 180–181° C. (dec.).

$$\lambda_{Max.}^{EtOH} = 242\ m\mu$$

Analysis.—Calculated for $C_{21}H_{26}O_2BrF$: C, 61.63; H, 6.40; Br, 19.53; F, 4.64. Found: C, 61.73; H, 6.62; Br, 19.48; F, 4.71.

I claim:
1-dehydro-17α-bromo-6α-fluoroprogesterone.

References Cited in the file of this patent

UNITED STATES PATENTS

| | | |
|---|---|---|
| 2,837,464 | Nobile | June 3, 1958 |
| 2,838,528 | Campbell et al. | June 10, 1958 |
| 2,924,610 | Marshall | Feb. 9, 1960 |

OTHER REFERENCES

Szpilfogel et al.: Rec. Trav. Chimique (Netherlands), vol. 75, pp. 475–478 (1956).
Engel et al.: Can. J. Biochem. and Physiol., vol. 35, page 1054, (1957).